(12) United States Patent
Kim

(10) Patent No.: US 10,666,027 B2
(45) Date of Patent: May 26, 2020

(54) PULLING EYE FOR SUBMARINE CABLE AND SUBMARINE CABLE COMPRISING PULLING EYE

(71) Applicant: LS CABLE & SYSTEM LTD., Anyang-si, Gyeonggi-do (KR)

(72) Inventor: Kyoung Soo Kim, Bucheon-si (KR)

(73) Assignee: LS CABLE & SYSTEM LTD., Anyang-Si, Gyeonggi-Do (KR)

( * ) Notice: Subject to any disclaimer, the term of this patent is extended or adjusted under 35 U.S.C. 154(b) by 64 days.

(21) Appl. No.: 16/079,438

(22) PCT Filed: Aug. 16, 2016

(86) PCT No.: PCT/KR2016/008954
§ 371 (c)(1),
(2) Date: Aug. 23, 2018

(87) PCT Pub. No.: WO2017/146324
PCT Pub. Date: Aug. 31, 2017

(65) Prior Publication Data
US 2019/0067920 A1    Feb. 28, 2019

(30) Foreign Application Priority Data
Feb. 24, 2016    (KR) .................. 10-2016-0021915

(51) Int. Cl.
*H02G 1/08*    (2006.01)
*H02G 9/00*    (2006.01)
*H02G 1/10*    (2006.01)
*H02G 9/02*    (2006.01)
*G02B 6/44*    (2006.01)

(52) U.S. Cl.
CPC ............. *H02G 1/081* (2013.01); *H02G 1/08* (2013.01); *H02G 9/00* (2013.01); *G02B 6/4465* (2013.01); *H02G 1/10* (2013.01); *H02G 9/02* (2013.01)

(58) Field of Classification Search
CPC ......... H02G 1/081; H02G 9/00; G02B 6/4465
See application file for complete search history.

(56) References Cited

U.S. PATENT DOCUMENTS

| | | | |
|---|---|---|---|
| 4,319,802 A | 3/1982 | Bowes | |
| 4,635,989 A * | 1/1987 | Tremblay | ............... F16G 11/04 254/134.3 FT |
| 5,687,954 A * | 11/1997 | Schroeder | ............... H02G 1/08 254/134.3 FT |

(Continued)

FOREIGN PATENT DOCUMENTS

| | | |
|---|---|---|
| CN | 102361266 A | 2/2012 |
| DE | 2429112 | 6/1975 |

(Continued)

OTHER PUBLICATIONS

International Search Report related International Application No. PCT/KR2016/008954; report dated Aug. 31, 2017; (3 pages).

(Continued)

*Primary Examiner* — Lee D Wilson
(74) *Attorney, Agent, or Firm* — K&L Gates LLP

(57) ABSTRACT

The present invention relates to a pulling eye for a submarine cable, a method of installing the pulling eye for a submarine cable, and a submarine cable including the pulling eye.

22 Claims, 16 Drawing Sheets

(56) References Cited

U.S. PATENT DOCUMENTS

| | | | | |
|---|---|---|---|---|
| 8,179,327 B1 * | 5/2012 | Clark | ................... | H02G 9/00 |
| | | | | 114/328 |
| 9,027,908 B1 * | 5/2015 | Calhoun | ............... | F16G 11/02 |
| | | | | 254/134.3 FT |
| 10,461,514 B2 * | 10/2019 | Crompton | .............. | H02G 1/081 |
| 2004/0041136 A1 * | 3/2004 | Ames | ................... | B66C 1/42 |
| | | | | 254/134.3 FT |
| 2010/0314151 A1 | 12/2010 | Worrall et al. | | |
| 2019/0067920 A1 * | 2/2019 | Kim | ................... | H02G 1/08 |

FOREIGN PATENT DOCUMENTS

| | | |
|---|---|---|
| JP | S49-14956 | 4/1974 |
| JP | H0980253 A | 3/1997 |
| JP | 2002072035 A | 3/2002 |
| JP | 2005312283 A | 11/2005 |
| KR | 100258548 B1 | 6/2000 |
| KR | 100601590 B1 | 7/2006 |

OTHER PUBLICATIONS

Written Opinion related International Application No. PCT/KR2016/008954; report dated Aug. 31, 2017; (9 pages).

European Search Report for related European Application No. 16891728.4; action dated Jul. 3, 2019; (9 pages).

* cited by examiner

PULLING EYE FOR SUBMARINE CABLE AND SUBMARINE CABLE COMPRISING PULLING EYE

CROSS-REFERENCE TO RELATED APPLICATIONS

The present application is a National Stage of International Application No. PCT/KR2016/008954, filed Aug. 16, 2016, which claims priority to Korean Application No. 10-2016-0021915, filed Feb. 24, 2016, the disclosures of which are incorporated herein by reference.

TECHNICAL FIELD

One embodiment of the present invention relates to a pulling eye for a submarine cable, a method of installing the pulling eye for a submarine cable, and a submarine cable including the pulling eye.

BACKGROUND ART

Generally, a pulling eye is a component provided at an end of a power cable to facilitate pulling the power cable when the power cable is installed. Furthermore, the pulling eye is used to prevent breakage of or damage to a conductor of the power cable when the power cable is pulled during the installation of the power cable.

However, generally, a submarine cable installed across the bottom of a sea includes a large number of components protecting inner components thereof from an extreme submarine environment, when compared to a power cable used underground (hereinafter referred to as a 'underground cable'). Accordingly, the submarine cable is more remarkably heavier in weight than the underground cable and thus a conductor of the submarine cable may be broken or the skin thereof may be damaged due to a self-load of the submarine cable when the submarine cable is installed by being pulled by the pulling eye. Furthermore, since the submarine cable is installed across the bottom of a sea, moisture may permeate an end of the submarine cable.

DETAILED DESCRIPTION OF THE INVENTION

Technical Problem

The present invention is mainly directed to a pulling eye capable of firmly pulling a submarine cable when the submarine cable is pulled to install the submarine cable, and preventing the submarine cable from being damaged, and a submarine cable including the pulling eye.

The present invention is also directed to a method of installing a pulling eye, which is capable of preventing the permeation of moisture into an end of a submarine cable at which the pulling eye is installed when the submarine cable is installed across the bottom of a sea, and reducing installation costs.

Technical Solution

According to an aspect of the present invention, there is provided a pulling eye for a submarine cable which includes at least a conductor, a metal sheath, an inner sheath, a plurality of sheathing wires, and a serving layer, the pulling eye comprising a sheathing wire fixing part configured to pressurize the sheathing wires exposed by removing the serving layer toward a center of the submarine cable from the outside, and fix bent ends of the sheathing wires thereon; a body part configured to be penetrated to allow the submarine cable to pass therethrough, and fastened with the sheathing wire fixing part on an inner circumferential surface thereof; and a head part configured to pressurize the sheathing wires bent at the sheathing wire fixing part in a lengthwise direction of the submarine cable, the head part being fastened with an upper end of the body part.

And the sheathing wire fixing part may comprise a fastening part having formed screw threads on an outer side surface thereof to be fastened with the inner circumferential surface of the body part; a center hole penetrating one end of the sheathing wire fixing part to another end thereof to correspond to the center of the submarine cable; stepped surfaces formed by a plurality of steps formed toward the other end from the one end toward; and a plurality of through holes formed in the stepped surfaces at the other end to allow the sheathing wires to pass therethrough, wherein each of the plurality of steps may have a round shape, and a center thereof corresponds to the center of the submarine cable.

And a difference between heights of each of the stepped surfaces and the stepped surface adjacent thereto may be less than a diameter of the sheathing wires.

And the sheathing wires penetrate the through holes and the ends thereof may be bent toward the center hole.

And an outer side of the body part may have a cylindrical shape.

And the body part may comprise screw threads formed on an inner side surface thereof, and screw threads formed on an outer side surface of the sheathing wire fixing part and screw threads formed on an outer side surface of the head part are engaged and coupled to each other.

And the head part comprises an extension part configured to be inserted into and fastened with the upper end of the body part, the extension part being provided in the form of a step on one end of the head part; and a front end extending from another end of the head part in the lengthwise direction of the submarine cable, and when inserted into and fastened with the upper end of the body part, the extension part may pressurize the ends of the sheathing wires bent and fixed on the sheathing wire fixing part.

And the extension part may comprise screw threads formed on an outer side surface thereof corresponding to an inner side surface of the upper end of the body part.

And when an accommodation part is formed by the sheathing wires fastened inside the body part and the inner side surface of the body part to accommodate the extension part, a height of the extension part may be set to be greater than a depth of the accommodation part and thus the ends of the sheathing wires are pressurized by the head part when the extension part is inserted into the accommodation part and fastened with the body part.

And the inner sheath is sequentially exposed by a certain length at an end of the submarine cable, and a watertight processor may be provided at an end of the exposed inner sheath.

And the watertight processor may comprises a first watertight part configured to seal the end of the exposed inner sheath and a side portion adjacent thereto; a termination cap configured to cover the first watertight part and the inner sheath; a second watertight part configured to be wound between the termination cap and the exposed inner sheath; at least one tension tape configured to cover the second watertight part; a heat shrinkable tube configured to cover the tension tape and the termination cap; and a guide cap configured to insert thereinto the termination cap surrounded by the heat shrinkable tube.

And the pulling eye may further comprise a PVC tape configured to cover between the body part and the serving layer.

And when a plurality of the sheathing wires form at least one sheathing wire layer, a number of the stepped surfaces may be greater than or equal to a number of sheathing wire layers.

According to an aspect of the present invention, there is provided a method of installing a pulling eye for a submarine cable which includes at least a conductor, a metal sheath, an inner sheath, a bedding layer, sheathing wires, and a serving layer, the method comprising: exposing the sheathing wires by removing the serving layer of the submarine cable by a certain length; inserting an end of the submarine cable at which the sheathing wires are exposed into a body part of the pulling eye; exposing the inner sheath by removing a portion of the bedding layer inside the exposed sheathing wires; water-tightening the exposed inner sheath; inserting the sheathing wires into a sheathing wire fixing part of the pulling eye to pass through the sheathing wire fixing part; bending ends of the sheathing wires toward a center of the sheathing wire fixing part from the outside of the sheathing wires; locating the sheathing wire fixing part inside the body part, and fastening the body part and the sheathing wire fixing part to cover an end of the water-tightened submarine cable; inserting the head part of the pulling eye into an end of the body part to be fastened with the body part.

And the bending of the ends of the sheathing wires may comprise bending sheathing wires penetrating through holes formed in a stepped surface adjacent to a center of the sheathing wire fixing part toward the center of the sheathing wire fixing part among through holes formed in the sheathing wire fixing part; and bending sheathing wires penetrating through holes formed in a stepped surface outside the stepped surface toward the center of the sheathing wire fixing part.

And when the head part is fastened with the body part, ends of the bent sheathing wires may be pressurized by the head part.

And the water-tightening of the exposed inner sheath may comprise winding a first watertight part around an end of the exposed inner sheath and a side thereof adjacent to the end of the exposed inner sheath; covering the first watertight part and the inner sheath with a termination cap; winding a second watertight part between the termination cap and the exposed inner sheath; covering the second watertight part with at least one tension tape; covering the tension tape and the termination cap with a heat shrinkable tube; and inserting the termination cap surrounded by the heat shrinkable tube into a guide cap.

And the method of installing a pulling eye for a submarine cable may further comprise winding a PVC tape between the fastening nut and the serving layer.

And according to an aspect of the present invention, there is provided a submarine cable comprising the pulling eye installed by the method.

And according to an aspect of the present invention, there is provided a submarine cable which includes at least a conductor, a metal sheath, an inner sheath, sheathing wires, and a serving layer, and includes a pulling eye on at least one end thereof, wherein the pulling eye may comprise a sheathing wire fixing part configured to pressurize the sheathing wires exposed by removing the serving layer toward a center of the submarine cable from the outside, and fix bent ends of the sheathing wires thereon; a body part configured to be penetrated to allow the submarine cable to pass therethrough, and fastened with the sheathing wire fixing part on an inner circumferential surface thereof; and a head part configured to pressurize the sheathing wires bent at the sheathing wire fixing part in a lengthwise direction of the submarine cable, the head part being fastened with an upper end of the body part.

And the sheathing wire fixing part may comprise a fastening part having formed screw threads on an outer side surface thereof to be fastened with the inner circumferential surface of the body part; a center hole penetrating one end of the sheathing wire fixing part to another end thereof to correspond to the center of the submarine cable; a plurality of stepped surfaces formed on the one end of the sheathing wire fixing part; stepped surfaces formed by a plurality of steps formed toward the other end from the one end; and a plurality of through holes formed in the stepped surfaces at the other end to allow the sheathing wires to pass therethrough, wherein each of the plurality of steps may have a round shape, and a center thereof corresponds to the center of the submarine cable.

And a difference between heights of each of the stepped surfaces and the stepped surface adjacent thereto may be less than a diameter of the sheathing wires.

And the sheathing wires may penetrate the through holes and the ends thereof are bent toward the center hole.

And an outer side of the body part may have a cylindrical shape.

And the body part may comprise screw threads formed on an inner side surface thereof, and screw threads formed on an outer side surface of the sheathing wire fixing part and screw threads formed on an outer side surface of the head part are engaged and coupled to each other.

And the head part comprises: an extension part configured to be inserted into and fastened with the upper end of the body part, the extension part being provided in the form of a step on one end of the head part; and a front end extending from another end of the head part in the lengthwise direction of the submarine cable, wherein, when inserted into and fastened with the upper end of the body part, the extension part may pressurize the ends of the sheathing wires bent and fixed on the sheathing wire fixing part.

And the extension part may comprise screw threads formed on an outer side surface thereof corresponding to an inner side surface of the upper end of the body part.

And when an accommodation part is formed by the sheathing wires fastened inside the body part and the inner side surface of the body part to accommodate the extension part, a height of the extension part may be set to be greater than a depth of the accommodation part and thus the ends of the sheathing wires are pressurized by the head part when the extension part is inserted into the accommodation part and fastened with the body part.

And the inner sheath may be sequentially exposed by a certain length at an end of the submarine cable, and a watertight processor may be provided at an end of the exposed inner sheath.

And the watertight processor may comprise a first watertight part configured to seal the end of the exposed inner sheath and a side portion adjacent thereto; a termination cap configured to cover the first watertight part and the inner sheath; a second watertight part configured to be wound between the termination cap and the exposed inner sheath; at least one tension tape configured to cover the second watertight part; a heat shrinkable tube configured to cover the tension tape and the termination cap; and a guide cap configured to insert thereinto the termination cap surrounded by the heat shrinkable tube.

And the submarine cable may further comprise a PVC tape configured to cover between the body part and the serving layer.

And the submarine cable may further comprise a gap maintenance member provided between one end of the sheathing wire fixing part and the end of the inner sheath.

And when a plurality of the sheathing wires form at least one sheathing wire layer, a number of the stepped surfaces may be greater than or equal to a number of sheathing wire layers.

Advantageous Effects

According to an embodiment of the present invention, a submarine can be firmly pulled when pulled to install the submarine cable, and be prevented from being damaged.

Furthermore, according to the present invention, the permeation of moisture into an end of a submarine cable at which a pulling eye is installed can be prevented when the submarine cable is installed across the bottom of a sea.

MODE OF THE INVENTION

Hereinafter, various embodiments of the present invention will be described in detail with reference to the accompanying drawings. First, a structure of a submarine cable will be described and then a structure of a pulling eye on one end of the submarine cable and a method of installing the pulling eye on the submarine cable will be described below.

Figure 1:
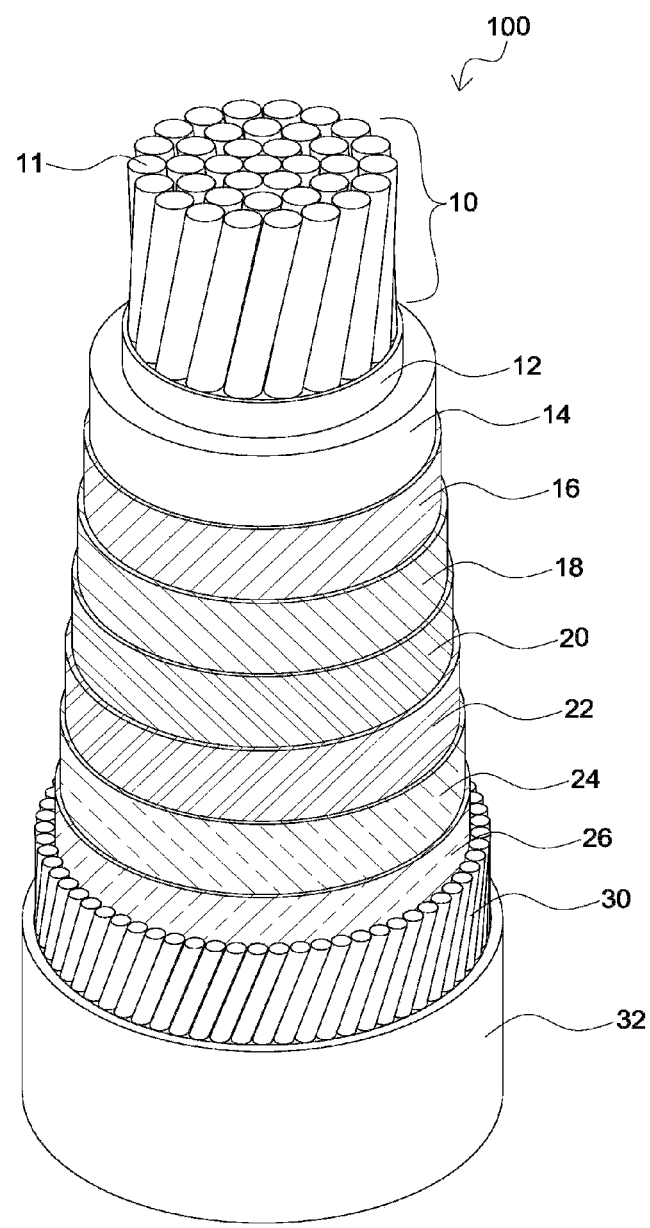
FIG. 1 is a perspective view of a submarine cable.

FIG. 1 is a partially cutaway perspective view illustrating a structure of a submarine cable 100.

Referring to FIG. 1, the submarine cable 100 includes a conductor 10 in a central region thereof. The conductor 10 may act as a path through which current flows, and may be formed of, for example, copper or aluminum. The conductor 10 is formed by twisting a plurality of element wires 11.

The conductor 10 may have a non-smooth surface and thus an electric field thereon may not be uniform and a corona discharge is likely to locally occur therein. The insulating performance of the conductor 10 may deteriorate when there is a gap between a surface of the conductor 10 and an insulating layer 14 which will be described below. To solve such problems, an outer side of the conductor 10 is covered with a semiconducting material such as semiconducting carbon paper. A layer formed of the semiconducting material will be referred to herein as an inner semiconducting layer 12.

The inner semiconducting layer 12 uniformizes a distribution of electric charges on a surface of the conductor 10 to obtain a uniform electric field, thereby improving the dielectric strength of an insulating layer 14 to be described below. Furthermore, the inner semiconducting layer 12 prevents formation of a gap between the conductor 10 and the insulating layer 14 to prevent a corona discharge and ionization. In addition, the inner semiconducting layer 12 may prevent the permeation of the insulating layer 14 into the conductor 10 during the manufacture of the submarine cable 100.

The insulating layer 14 is provided on an outer side of the inner semiconducting layer 12. The insulating layer 14 electrically insulates the conductor 10 having a rectangular shape from the outside. Generally, a breakdown voltage of the insulating layer 14 should be high and the insulating performance thereof should be stably maintained for a long time period. Furthermore, the insulating layer 14 should have a low dielectric loss rate and heat resistance performance, e.g., a heat resistance property.

The insulating layer 14 may be formed of polyolefin resin, such as polyethylene and polypropylene. Here, the polyethylene resin may be crosslinked resin, and be produced by silane or an organic peroxide, e.g., dicumyl peroxide (DCP), as a crosslinking agent.

The insulating layer 14 may be formed by a paper insulation process of winding insulation paper around a surface of the inner semiconducting layer 12. In order to improve an insulating property, the conductor 10 is impregnated with insulation oil in a state in which the surface thereof is wound with the insulation paper. The insulation oil is absorbed into the insulation paper through the impregnation process. In this case, the submarine cable 100 may be defined as a so-called 'mass-impregnated (MI) cable' when high-viscosity insulation oil is used, and defined as a so-called 'oil-filled (OF) cable' when relatively low viscosity insulation oil is used. In detail, the insulating layer 14 may be formed by rolling up a plurality of pieces of insulating paper. For example, Kraft paper or composite insulation paper formed by repeatedly stacking Kraft paper and thermoplastic resin, such as polypropylene resin, may be used as the insulation paper.

When not only the inside of the insulating layer 14 but also the outside thereof are not shielded, part of an electric field is absorbed into the insulating layer 14 but most of the electric field is discharged to the outside. In this case, when the electric field increases to more than a certain level, the insulating layer 14 and the surface of the submarine cable 100 may be damaged by the electric field. Thus, a semiconducting layer is provided on an outer side of the insulating layer 14, and will be referred to as an outer semiconducting layer 16 to be distinguished from the inner semiconducting layer 12 described above. The outer semiconducting layer 16 may protect the insulating layer 14 by suppressing a non-uniform electric field due to an insulating layer thickness variation, and improve the dielectric strength of the insulating layer 14 by making a distribution of electric lines of force between the outer semiconducting layer 16 and the inner semiconducting layer 12 be equipotential.

The insulation performance of the insulation oil or an insulation compound impregnated in these insulating layers decreases when a foreign substance such as water permeates the insulation layers. To solve this problem, a metal sheath 18 formed of lead is provided at an outer side of the outer semiconducting layer 16. Furthermore, a cable protection layer is provided outside the metal sheath 18 to protect the inside of the submarine cable 100.

The cable protection layer may be formed in a single layer formed of polymer resin but may be formed in multiple layers. The cable protection layer according to an embodiment of the present invention includes an inner sheath 20 formed of polyethylene or the like outside the metal sheath 18, and the inner sheath 20 is covered with non-woven fabric tapes 22 and 26 and a proofed tape 24.

Sheathing wires 30 are provided on an outer side of the submarine cable 100 to enhance mechanical strength, so that the submarine cable 100 may be protected from a submarine environment.

In detail, the sheathing wires 30 may be provided at an outer side of the proofed tape 24 or the outer side of the proofed tape 24 may be wound with a non-woven fabric tape (not shown) and then the sheathing wires 30 may be provided on the non-woven fabric tape. A sheathing wire layer may be formed by forming a plurality of the sheathing wires 30 covering the inner sheath 20, the proofed tape 24 or the non-woven fabric tape, and the mechanical strength of the submarine cable 100 may be improved when the submarine cable 100 includes a plurality of sheathing wire layers.

A serving layer 32 is provided outside the sheathing wires 30, i.e., outside the submarine cable 100. The serving layer 32 is provided outside the submarine cable 100 to protect the inner components of the submarine cable 100. In particular, in the case of the submarine cable 100, the serving layer 32 has weather resistance and high mechanical strength to endure a submarine environment such as seawater. For example, the serving layer 32 may be formed of polypropylene yarn or the like.

A structure of a pulling eye 200 provided at an end of the submarine cable 100 having the above-described structure will be described in detail with reference to the drawings below.

Figure 2:
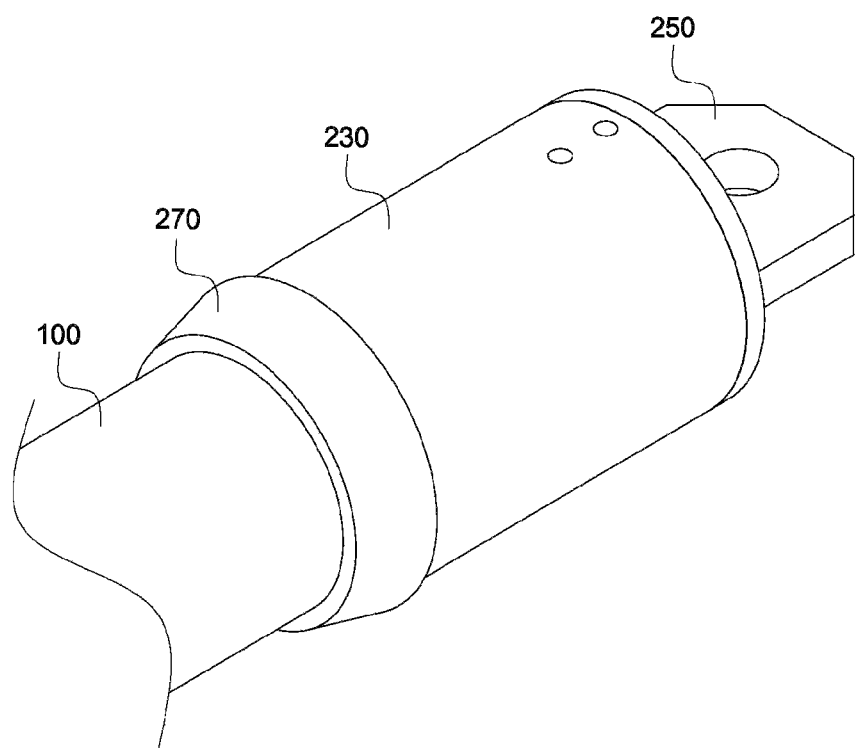
FIG. 2 is a perspective view of a pulling eye installed on an end of a submarine cable, according to an embodiment of the present invention.
Figure 3:
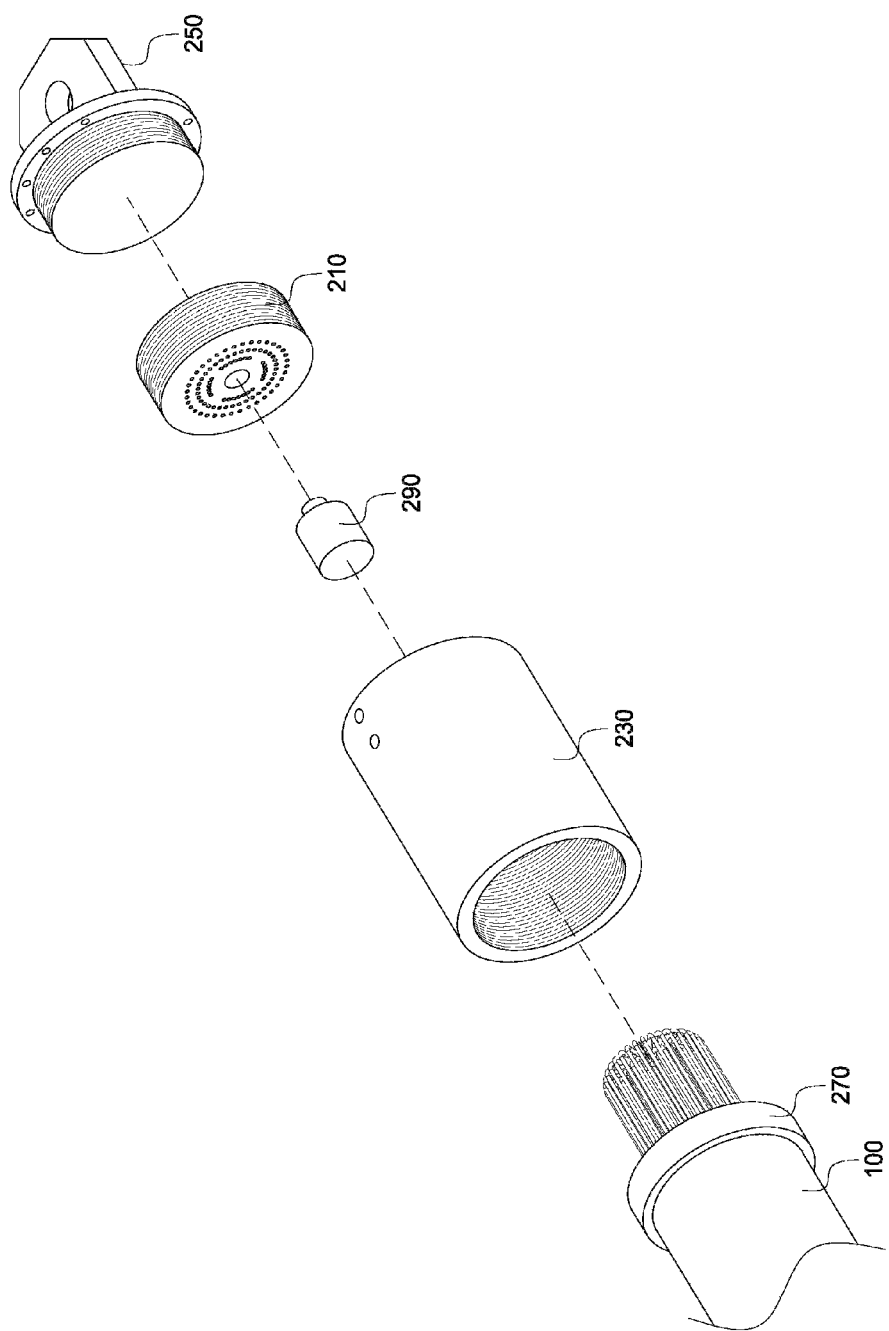
FIG. 3 is an exploded perspective view of the pulling eye of FIG. 2 according to an embodiment of the present invention.

FIG. 2 is a perspective view of a pulling eye installed on an end of a submarine cable, according to an embodiment of the present invention. FIG. 3 is an exploded perspective view of FIG. 2.

Referring to FIGS. 2 and 3, the pulling eye 200 includes a sheathing wire fixing part 210 which is configured to pressurize the sheathing wires 30 exposed due to the removal of the serving layer 32 toward a center of the submarine cable 100 from the outside and at which bent ends of the sheathing wires 30 are fixed, a body part 230 configured to be penetrated to allow the submarine cable 100 to pass therethrough and fastened with the sheathing wire fixing part 210 on an inner circumferential surface thereof, and a head part 250 fastened with an upper end of the body part 230 to pressurize the bent sheathing wires 30 on the sheathing wire fixing part 210 in a lengthwise direction of the submarine cable 100.

The sheathing wire fixing part 210 may be configured to allow the sheathing wires 30 exposed by removing the serving layer 32 of the submarine cable 100 to pass therethrough. In detail, the sheathing wire fixing part 210 may have a cylindrical shape or a disc shape, and include a plurality of through holes 214a, 214b and 214c allowing the sheathing wires 30 to respectively pass therethrough. An external diameter of the sheathing wire fixing part 210 corresponds to an internal diameter of the body part 230 and thus the sheathing wire fixing part 210 may be fastened with the body part 230, and the sheathing wires 30 exposed by removing the serving layer 32 penetrate the through holes 214a, 214b and 214c, respectively, and are bent by being pressurized toward the center of the submarine cable 100, thereby fixing bent ends of the sheathing wires 30 on the sheathing wire fixing part 210.

Figure 6:
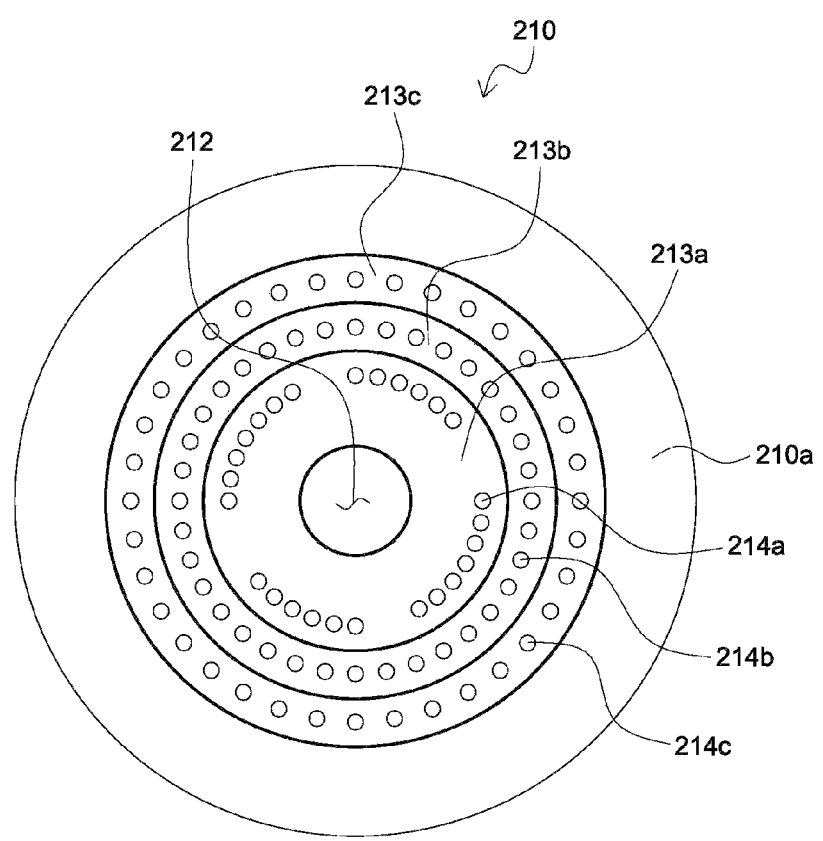
FIG. 6 is a plan view of a sheathing wire fixing part of a pulling eye, according to an embodiment of the present invention.
Figure 7:
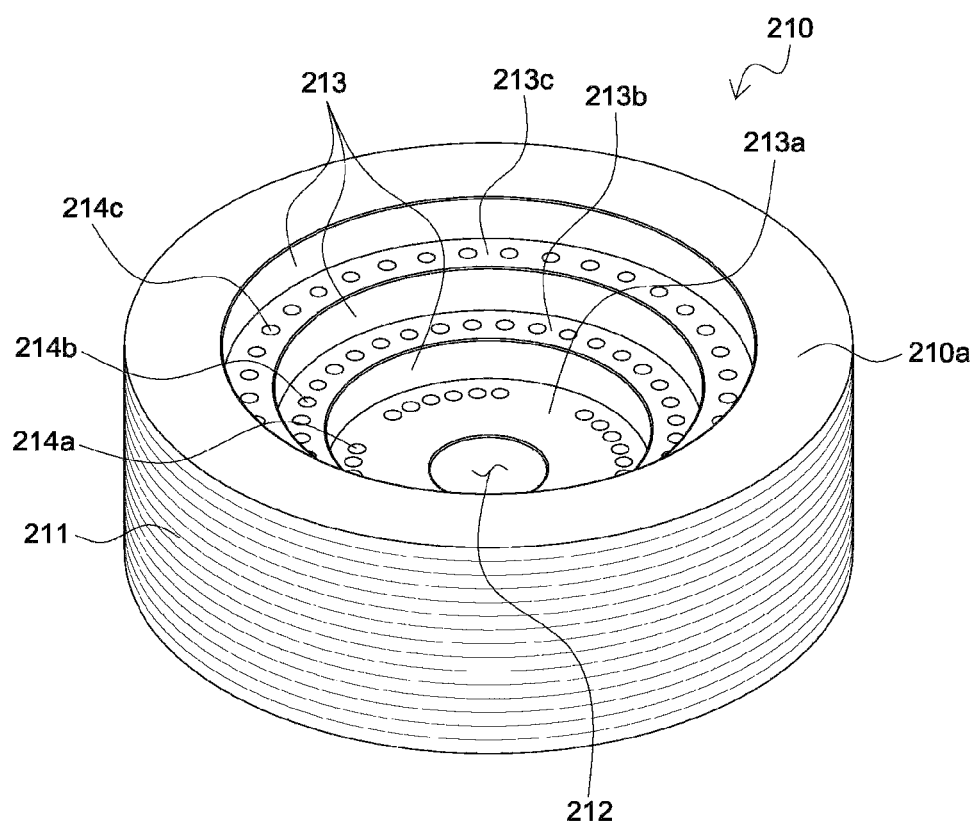
FIG. 7 is a perspective view of the sheathing wire fixing part of the pulling eye, according to the embodiment of the present invention.
Figure 8:
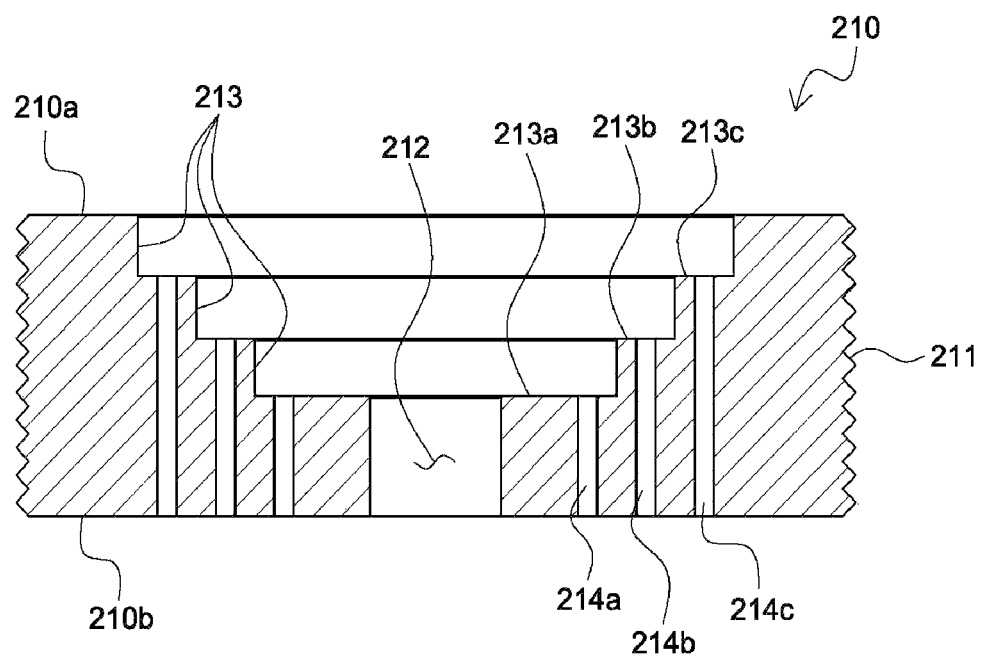
FIG. 8 is a cross-sectional view of the sheathing wire fixing part of the pulling eye, according to the embodiment of the present invention.

FIGS. 6 to 8 are diagrams illustrating an example of a sheathing wire fixing part. Specifically, FIG. 6 is a plan view of a sheathing wire fixing part of a pulling eye, according to an embodiment of the present invention. FIG. 7 is a perspective view of the sheathing wire fixing part of a pulling eye, according to the embodiment of the present invention. FIG. 8 is a cross-sectional view of the sheathing wire fixing part of a pulling eye, according to the embodiment of the present invention.

Referring to FIGS. 6 to 8, the sheathing wire fixing part 210 may include a fastening part 211 having screw threads formed on an outer side thereof to be fastened with an inner circumferential surface of the body part 230; a center hole 212 penetrating one end of the sheathing wire fixing part 210 to another end thereof to correspond to the center of the submarine cable 100; stepped surfaces 213a, 213b, and 213c formed by a plurality of steps 213 formed from the one end of the sheathing wire fixing part 210 to the other end thereof; and a plurality of through holes 214a, 214b, 214c respectively formed at the stepped surfaces 213a, 213b, and 213c at the other end of the sheathing wire fixing part 210 such that the sheathing wires 30 may pass therethrough.

The sheathing wire fixing part 210 may have, for example, a cylindrical shape or a disc shape as illustrated in FIGS. 6 to 8. A diameter of the cylindrical sheathing wire fixing part 210 corresponds to the internal diameter of the body part 230, and the sheathing wire fixing part 210 may be located inside the body part 230 by being fastened with the body part 230.

The sheathing wire fixing part 210 may have the fastening part 211 consisting of screw threads on an outer side thereof. The sheathing wire fixing part 210 and the body part 230 are fastened with each other by engaging the fastening part 211 with screw threads formed on the inner circumferential surface of the body part 230.

The sheathing wire fixing part 210 may include the center hole 212 formed to correspond to the center of the submarine cable 100. The center hole 212 may have a certain diameter in a center region of the sheathing wire fixing part 210, and penetrate one end 210a of the sheathing wire fixing part 210 to another end 210b thereof. The other end 210b is a bottom surface of the cylindrical sheathing wire fixing part 210 facing a watertight processor 300 of the submarine cable 100. The one end 210a is an upper surface of the sheathing wire fixing part 210 opposite the other end 210b. That is, the center hole 212 is an opening penetrating the one end 210a which is the upper surface of the cylindrical sheathing wire fixing part 210 to the other end 210b which is a lower surface of the cylindrical sheathing wire fixing part 210.

Figure 4:
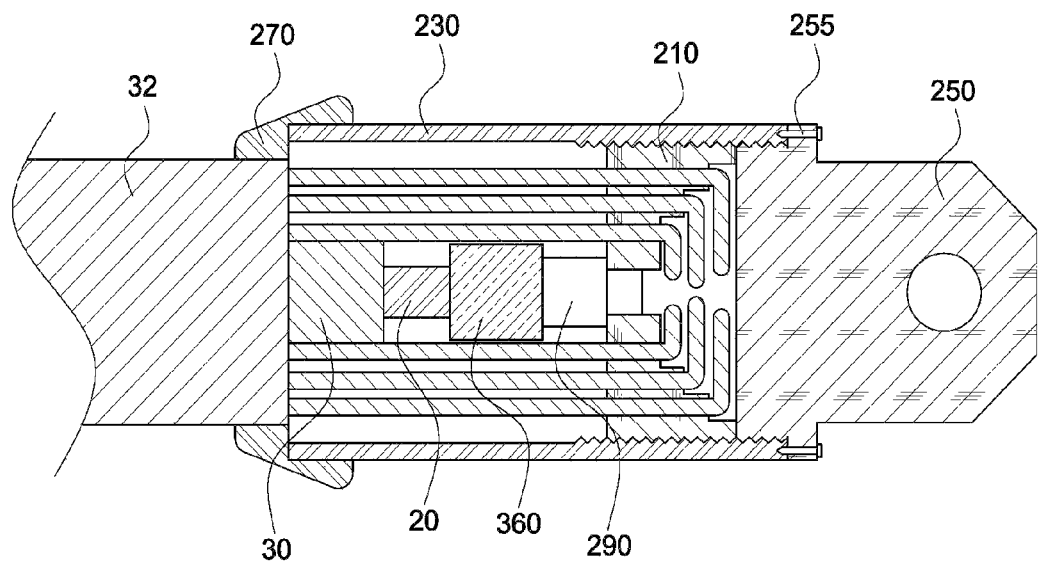
FIG. 4 is a cross-sectional view taken along line IV-IV of FIG. 2.

A gap maintenance member 290 may be inserted into the center hole 212. Referring to FIG. 4, one end of the gap maintenance member 290 located between the sheathing wire fixing part 210 and a guide cap 360 and having a step may be inserted into the center hole 212. As the one end of the gap maintenance member 290 is inserted into the center hole 212, the gap maintenance member 290 may be located between the sheathing wire fixing part 210 and the guide cap 360 to maintain the position of the sheathing wire fixing part 210 at the center of the submarine cable 100 while maintaining a gap between the sheathing wire fixing part 210 and the guide cap 360.

The steps 213 may be formed from the one end 210a of the sheathing wire fixing part 210 toward the other end 210b, and the sheathing wire fixing part 210 may include the stepped surfaces 213a, 213b, and 213c formed by the steps 213. That is, the stepped surface 213c may be formed by the step 213 formed from the one end 210a toward the other end 210b, the stepped surface 213b may be formed by the step 213 formed from an inner side of the stepped surface 213c toward the other end 210b, and the stepped surface 213a may be formed by the step 213 formed from the inner side of the stepped surface 213b toward the other end 210b.

Each of the stepped surfaces 213a, 213b, and 213c has a round shape and a center thereof may correspond to a center of a cross section of the submarine cable 100. The stepped surfaces 213a, 213b, and 213c have different diameters, and the diameters thereof may sequentially increase to the outermost stepped surface 213c from the stepped surface 213a adjacent to the center hole 212.

The through holes 214a, 214b, and 214c may be formed in the stepped surfaces 213a, 213b, and 213c. The through holes 214a, 214b, and 214c may be formed along the circumferences of the stepped surfaces 213a, 213b, and 213c.

That is, the through holes 214a penetrated toward the other end 210b may be formed in the stepped surface 213a. The through holes 214a may be formed along the circumference of the stepped surface 213a. The through holes 214b penetrated toward the other end 210b may be formed in the stepped surface 213b. The through holes 214b may be formed along the circumference of the stepped surface 213b. The through holes 214c penetrated toward the other end 210b may be formed in the stepped surface 213c. The through holes 214c may be formed along the circumference of the stepped surface 213c.

The number of the steps 213 and the number of the stepped surfaces 213a, 213b, and 213c may be greater than that of layers of the sheathing wire layer of the submarine cable 100. The sheathing wire layer is formed such that the sheathing wires 30 are located adjacent to each other to cover the inner sheath 20, the proofed tape 24, or the non-woven fabric tape of the submarine cable 100. However, when the sheathing wires 30 located adjacent to each other to form the sheathing wire layer penetrate the through holes 214a, 214b, and 214c, the sheathing wires 30 are spaced apart from each other. Thus, when the number of the steps 213 and the number of the stepped surfaces 213a, 213b, and 213c are each equal to that of the layers of the sheathing wire layer, the number of through holes corresponding to the number of the sheathing wires 30 constituting the sheathing wire layer are not secured. Accordingly, in order to secure a space sufficient to fix the sheathing wires 30, the number of the steps 213 and the number of the stepped surfaces 213a, 213b, and 213c are preferably greater than that of the layers of the sheathing wire layer of the submarine cable 100.

The sheathing wires 30 may penetrate the through holes 214a, 214b, and 214c, and an end of the sheathing wire fixing part 210 penetrated by the sheathing wires 30 may be bent toward the center hole 212 of the sheathing wire fixing part 210.

Figure 9:
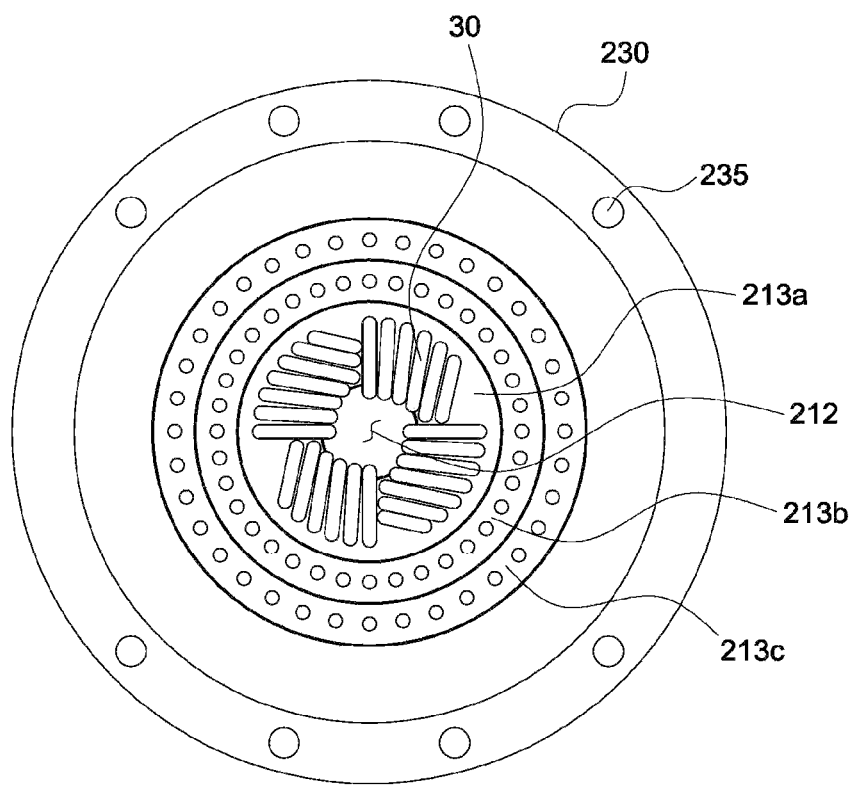
FIGS. 9 to 11 are plan views of sheathing wires bent at a sheathing wire fixing part.
Figure 10:
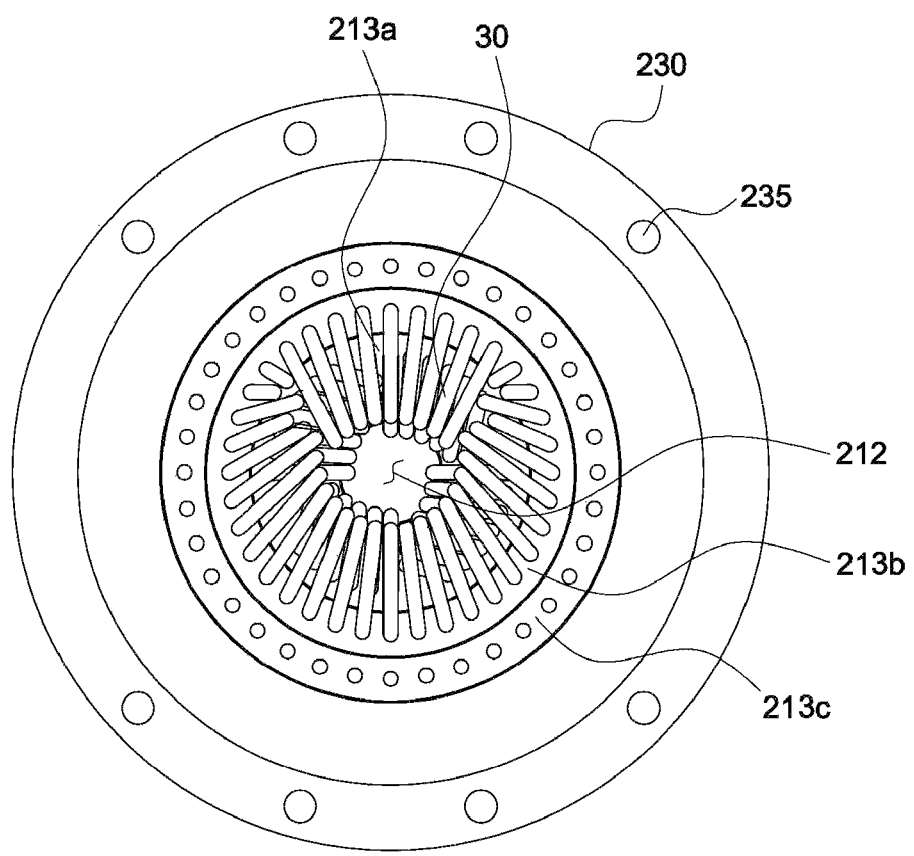
Figure 11:
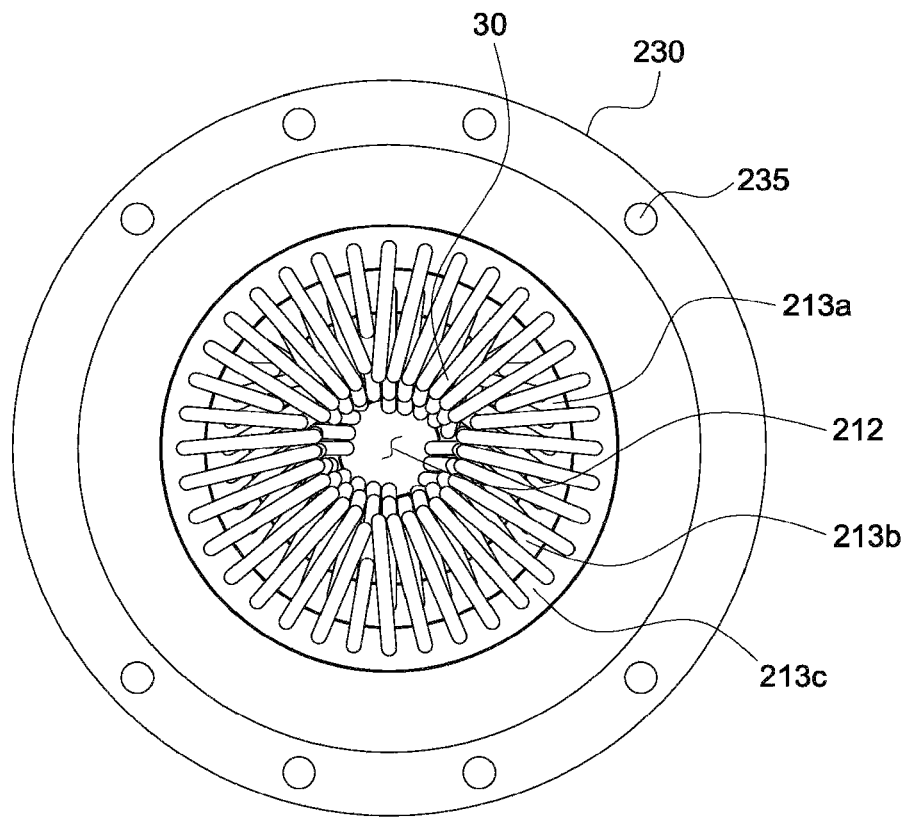

FIGS. 9 to 11 are plan views of sheathing wires bent at a sheathing wire fixing part. In detail, FIG. 9 is a plan view illustrating a state in which the sheathing wires 30 penetrating the through holes 214a formed in the stepped surface 213a are bent. FIG. 10 is a plan view illustrating a state in which the sheathing wires 30 penetrating the through holes 214b formed in the stepped surface 213b are bent. FIG. 11 is a plan view illustrating a state in which the sheathing wires 30 penetrating the through holes 214c formed in the stepped surface 213c are bent.

Referring to FIG. 9, when the sheathing wires 30 penetrate the through holes 214a, 214b, and 214c, first, the sheathing wires 30 penetrate the through holes 214a formed in the stepped surface 213a most adjacent to the center hole 212 of the sheathing wire fixing part 210. Ends of the sheathing wires 30 penetrating the through holes 214a formed in the stepped surface 213a may be bent toward the center hole 212 of the sheathing wire fixing part 210 as illustrated in FIG. 9. The ends of the sheathing wires 30 may be bent to be in contact with the stepped surface 213a.

After some of the sheathing wires 30 penetrate the through holes 214a formed in the stepped surface 213a and are thus bent, the sheathing wires 30 may penetrate the through holes 214b formed in stepped surface 213b outside the stepped surface 213a, and ends of the sheathing wires 30 penetrating the through holes 214b formed in stepped surface 213b may be bent toward the center hole 212 of the sheathing wire fixing part 210, as illustrated in FIG. 10.

The ends of the sheathing wires 30 penetrating the through holes 214b formed in the stepped surface 213b may be bent to be in contact with the sheathing wires 30 bent to be in contact with the stepped surface 213a. In detail, the difference between heights of one stepped surface and another stepped surface adjacent thereto may be less than a diameter of sheathing wires. That is, the difference between the heights of the stepped surface 213a and the stepped surface 213b may be less than the diameter of the sheathing wires 30. In this case, the sheathing wires 30 penetrating the through holes 214b formed in the stepped surface 213b may be bent and thus come into contact with the sheathing wires 30 bent to be in contact with the stepped surface 213a, After some of the sheathing wires 30 penetrate the through holes 214b formed in the stepped surface 213b and thus are bent, the sheathing wires 30 may penetrate the through holes 214c formed in the stepped surface 213c outside the stepped surface 213b, and the ends of the sheathing wires 30 penetrating the through holes 214c formed in the stepped surface 213c may be bent toward the center hole 212 of the sheathing wire fixing part 210, as illustrated in FIG. 11.

When the difference between the heights of one stepped surface and another stepped surface adjacent thereto is less than the diameter of the sheathing wires as described above, i.e., when the difference between the heights of the stepped surface 213b and the stepped surface 213c is less than the diameter of the sheathing wires 30, the sheathing wires 30 penetrating the through holes 214c formed in the stepped surface 213c may be bent and come into contact with the sheathing wires 30 bent to be in contact with the stepped surface 213b.

As described above, as the ends of the sheathing wires 30 penetrating different stepped surfaces are bent to be in contact with each other in the lengthwise direction of the submarine cable 100 and the head part 250 is fastened with the body part 230, the bent sheathing wires 30 are pressurized by the head part 250 and thus a force of fixing the sheathing wires 30 onto the sheathing wire fixing part 210 may be increased, as will be described below.

The body part 230 may have a cylindrical shape configured to be penetrated to insert the submarine cable 100 thereinto, and may be fastened with the sheathing wire fixing part 210 on an inner circumferential surface 231 thereof to cover sides of the submarine cable 100 and be fastened with the head part 250 on an end 232 thereof.

FIG. 4 is a cross-sectional view taken along line IV-IV of FIG. 2.

Referring to FIG. 4, the body part 230 may cover the sides of the submarine cable 100. The body part 230 may have a cylindrical shape with an opening which the submarine cable 100 may penetrate. That is, the body part 230 may have an external diameter Do and an internal diameter Di, and the internal diameter Di may be set to correspond to an external diameter of the submarine cable 100 such that the submarine cable 100 may penetrate the body part 230.

Screw threads 232 may be formed on the inner circumferential surface 231 of the body part 230. The screw threads 232 on the inner circumferential surface 231 may be fastened with screw threads 211 formed on an outer side surface of the sheathing wire fixing part 210, and may be engaged and coupled to screw threads formed on an outer side surface of the head part 250.

That is, the body part 230 is provided on the serving layer 32 by inserting the submarine cable 100 into the internal diameter Di of the body part 230 before arranging the sheathing wire fixing part 210 after removal of the serving layer 32 of the submarine cable 100. After the exposed sheathing wires 30 are bent by penetrating them into the sheathing wire fixing part 230, the body part 230 is moved to the sheathing wire fixing part 210, and rotated to engage the screw threads 232 on the inner circumferential surface 231 of the body part 230 and screw threads on an outer circumferential surface of the sheathing wire fixing part 210, thereby fastening the body part 230 and the sheathing wire fixing part 210 with each other. The sheathing wire fixing part 210 is located inside the body part 230 through the engagement of the screw threads.

The screw threads 232 on the inner circumferential surface 231 of the body part 230 and the screw threads on the outer side surface of the head part 250 may be engage and coupled to each other. Since one end of the body part 230 is fastened with the head part 250, an end of the submarine cable 100 is surrounded by the body part 230 and the head part 250.

The head part 250 may be fastened with an upper end of the body part 230 to pressurize the sheathing wires 30 bent at the sheathing wire fixing part 210 in the lengthwise direction of the submarine cable 100.

Figure 12:
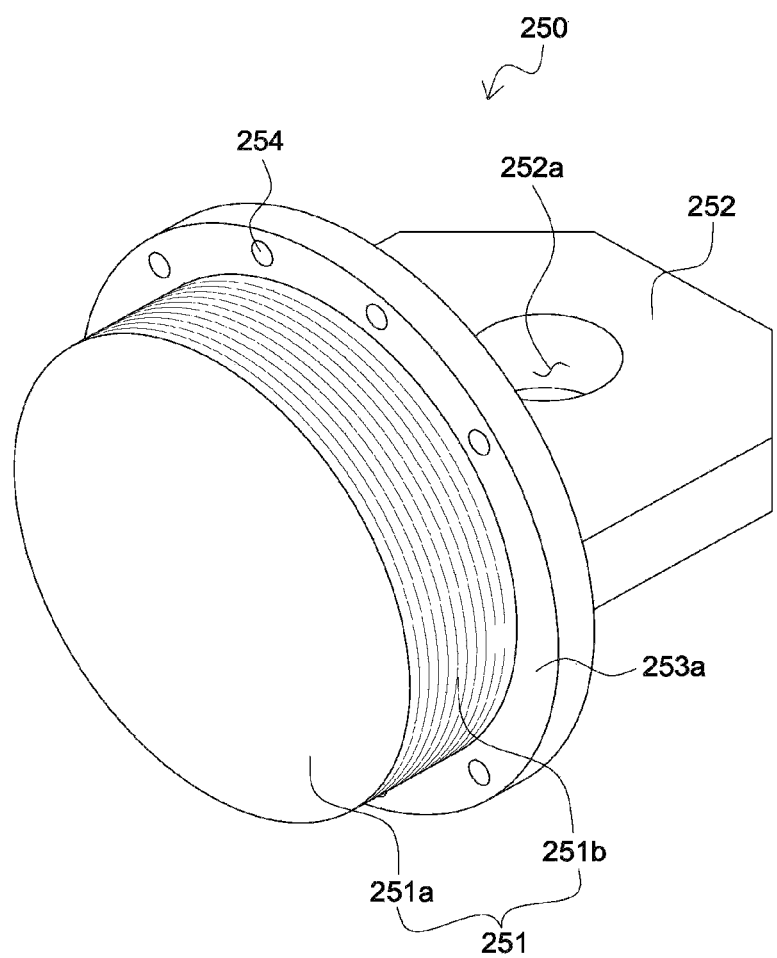
FIG. 12 is a perspective view of a head part of a pulling eye according to an embodiment of the present invention.
Figure 13:
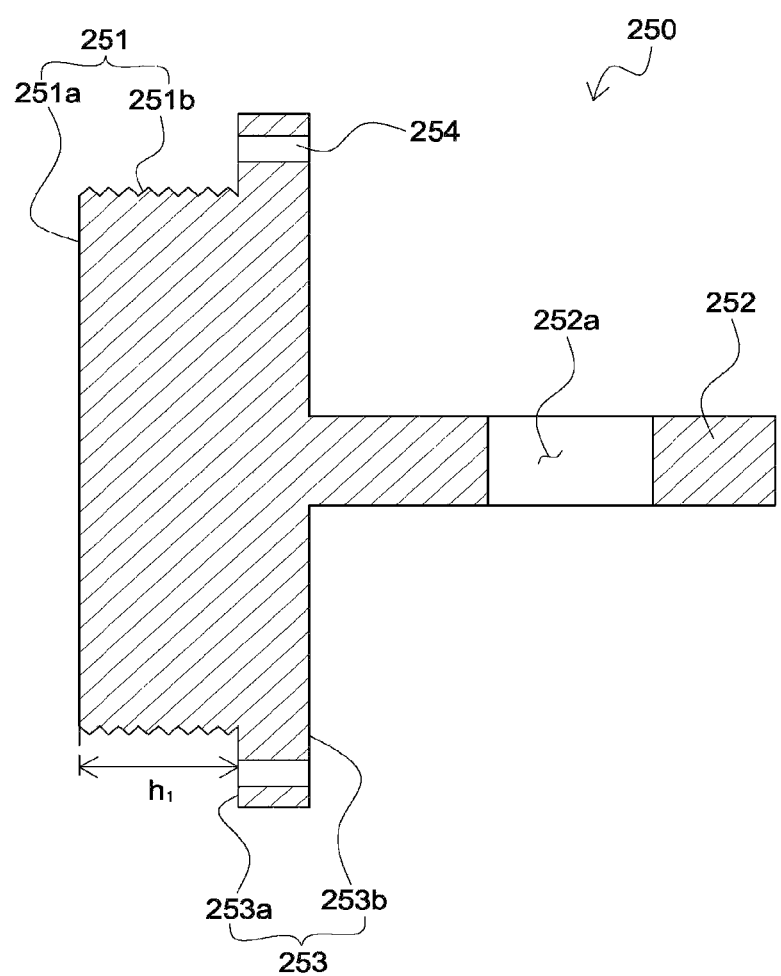
FIG. 13 is a cross-sectional view of a head part of a pulling eye according to an embodiment of the present invention.

FIGS. 12 and 13 are diagrams illustrating the head part 250 of a pulling eye, according to an embodiment. That is, FIG. 12 is a perspective view of the head part 250 of the pulling eye, according to an embodiment of the present invention. FIG. 13 is a cross-sectional view of the head part 250 of the pulling eye, according to an embodiment of the present invention.

Referring to FIGS. 12 and 13, the head part 250 includes an extension part 251 provided in the form of a step on one end 253a of the head part 250 to be inserted into and fastened with the upper end of the body part 230, and a front end 252 extending from another end 253b of the head part 250 in the lengthwise direction of the submarine cable 100.

The extension part 251 may have a diameter corresponding to the internal diameter of the body part 230 to be inserted into and fastened with the upper end of the body part 230, and screw threads 251b may be formed on an outer side surface of the extension part 251. The head part 250 may be fastened with the body part 230 by engaging the screw threads 251b on the outer side surface of the extension part 251 and the screw threads 231a on the inner circumferential surface of the body part 230.

When the extension part 251 is inserted into and fastened with the upper end of the body part 230, the ends of the sheathing wires 30 bent and fixed on the sheathing wire fixing part 210 may be pressurized by the extension part 251.

Figure 19:
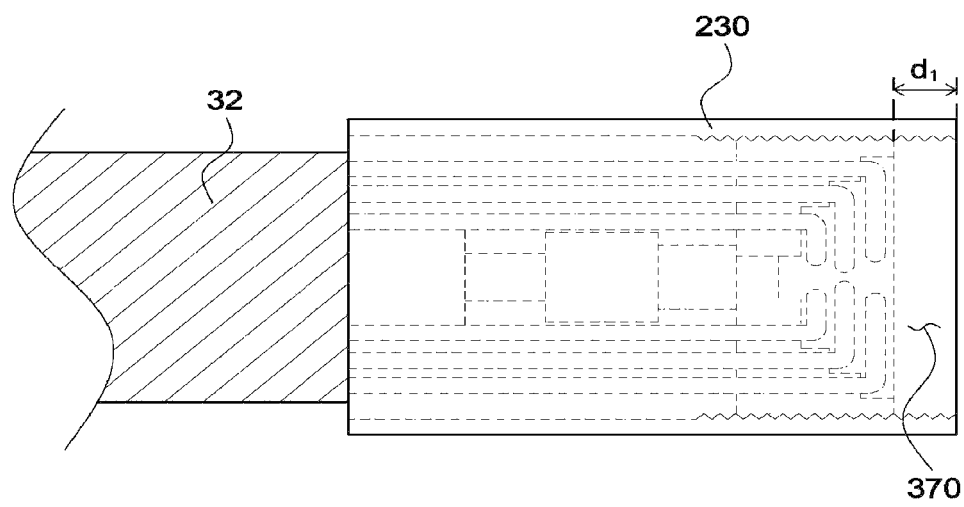

In detail, when an accommodation part 370 of FIG. 19 configured to accommodate the extension part 251 is formed by the sheathing wire fixing part 210 fastened inside the body part 230 and an inner side surface of the body part 230, a height h1 of the extension part 251 may be set to be greater than a depth d1 of the accommodation part 370, and thus, the extension part 251 of the head part 250 may pressurize the ends of the sheathing wires 30 bent on the uppermost stepped surface 213c of the sheathing wire fixing part 210, when the extension part 251 is inserted into the accommodation part 370 and fastened with the body part 230.

Furthermore, as described above, since the difference between the heights of the stepped surfaces of the sheathing wire fixing part 210 is set to be less than the diameter of the sheathing wires 30, the ends of the sheathing wires which penetrate through holes formed in different stepped surfaces and thus are bent come into contact with each other in the lengthwise direction of the submarine cable 100. Thus, by fastening the head part 250 having the extension part 251 in which the height h1 of the extension part 251 is greater than the depth d1 of the accommodation part 370 with the body part 230, the ends of the sheathing wires 30 bent on the uppermost stepped surface 213c of the sheathing wire fixing part 210 are pressurized by the extension part 251 and the ends of the sheathing wires 30 bent on the other stepped surfaces 213b and 213a are pressurized by the ends of the sheathing wires 30 bent on the stepped surface 213c, thereby increasing a force of fixing the sheathing wires 30.

In the head part 250, a plurality of fastening holes 254 may be formed in a circumferential part 253 having formed the steps 213 thereon. The circumferential part 253 comes into contact with the upper end of the body part 230 when the extension part 251 is accommodated in the accommodation part 370 of the body part 230. The fastening hole 254 penetrating the circumferential part 253 corresponds to a fastening hole formed in the upper end of the body part 230, and the head part 250 may be coupled to the body part 230 by penetrating a bolt 255 of FIG. 4 into the fastening hole 254 of the circumferential part 253 and fastening the bolt 255 with the fastening hole of the body part 230.

Figure 5:
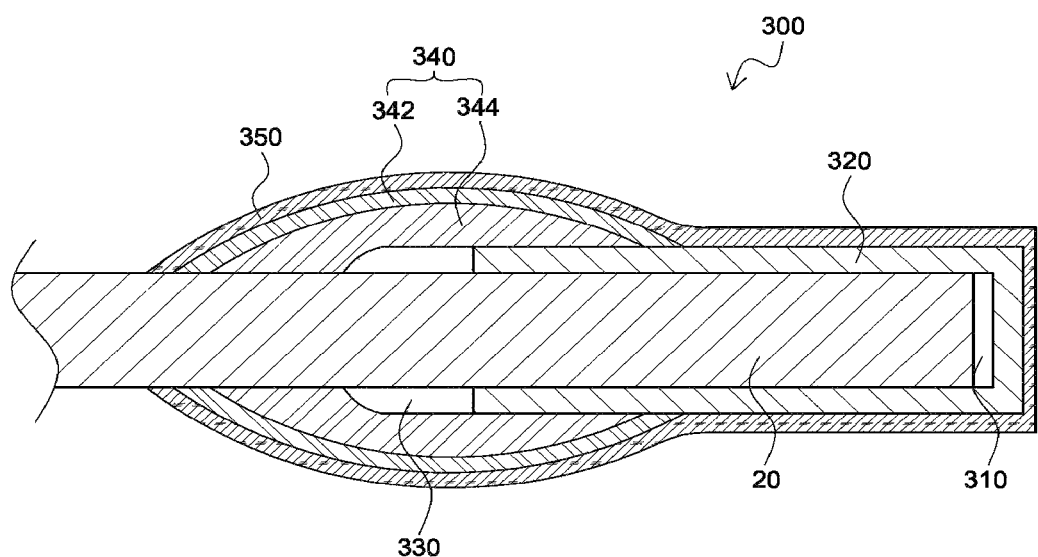
FIG. 5 is a partially exploded cross-sectional view of a watertight processor of FIG. 4.

FIG. 5 is a partially exploded cross-sectional view of a region A of FIG. 4 for explaining the watertight processor 300.

Referring to FIG. 5, the watertight processor 300 may include a first watertight part 310 sealing an end of the exposed inner sheath 20 and a side portion adjacent thereto, a termination cap 320 covering the first watertight part 310 and the inner sheath 20, a second watertight part 330 wound between the termination cap 320 and the exposed inner sheath 20, at least one tension tape 340 covering the second watertight part 330, a heat shrinkable tube 350 covering the tension tape 340 and the termination cap 320, and the guide cap 360 configured to insert thereinto the termination cap 320 surrounded by the heat shrinkable tube 350.

First, an end surface of the exposed inner sheath 20 of the submarine cable 100 and a side surface thereof adjacent to the end surface are sealed by the first watertight part 310, and the termination cap 320 is put on an end of the inner sheath 20, thereby covering the first watertight part 310 and the inner sheath 20 with the termination cap 320.

The first watertight part 310 may be, for example, an NF500 watertight part. As described above, the end of the exposed inner sheath 20 and the side surface adjacent thereto may be covered with the NF500 watertight part.

The termination cap 320 may be formed of a metal, and configured to cover the first watertight part 310 and the inner sheath 20. When the end of the inner sheath 20 is inserted into the termination cap 320, the inner sheath 20 is inserted into the termination cap 320 by applying a force to the termination cap 320 to prevent damage to the first watertight part 310 attached to the end of the inner sheath 20.

When the termination cap 320 is put on the end of the inner sheath 20, a gap may be generated between the termination cap 320 and the inner sheath 20 of the submarine cable 100. Since seawater may permeate the gap, the second watertight part 330 may be formed between the termination cap 320 and the inner sheath 20 to prevent the permeation of the seawater, and be wound around at least a portion of the termination cap 320 and/or the inner sheath 20. The second watertight part 330 is formed of the same material as the first watertight part 310 but is not limited thereto and may be formed of a different material.

The at least one tension tape 340 pressurizing the second watertight part 330 and covering the second watertight part 330 may be provided to improve the watertightness of the second watertight part 330. For example, the tension tape 340 may include a first tension tape 344 directly wound around the second watertight part 330, and a second tension tape 342 wound around the first tension tape 344. For example, the first tension tape 344 may be a 3M 130C tape, and the second tension tape 342 may be a PVC tape. However, the types and number of these tension tapes are not limited thereto and may be appropriately controlled.

The heat shrinkable tube 350 may be configured to cover the tension tape 340 and the termination cap 320 to block the permeation of seawater into the inner sheath 20.

The guide cap 360 may be put on the heat shrinkable tube 350. When the termination cap 320 surrounded by the heat shrinkable tube 350 is inserted into the guide cap 360, the termination cap 320 surrounded by the heat shrinkable tube 350 may be protected from mechanical stress.

In FIGS. 2 to 4, reference numeral '270' represents a PVC tape, and the PVC tape is configured to cover between the fastening nut 250 and the serving layer 320, thereby improving the watertightness of the pulling eye 200.

A process of installing the pulling eye 200 having the above structure at an end of the submarine cable 100 will be described below.

The process of installing the pulling eye 200 may include exposing the sheathing wires 30 by removing the serving layer 32 of the submarine cable 100 by a certain length, inserting an end of the submarine cable 100 at which the sheathing wires 30 are exposed into the body part 230 of the pulling eye 200, exposing the inner sheath 20 by removing a portion of bedding layer inside the exposed sheathing wires 30, water-tightening the exposed inner sheath 20, inserting the sheathing wires 30 into the sheathing wire fixing part 210 of the pulling eye 200 to pass through the sheathing wire fixing part 210, bending ends of the sheathing wires 30 from the outside of the sheathing wires 30 toward a center of the sheathing wire fixing part 210, locating the sheathing wire fixing part 210 inside the body part 230 and fastening the body part 230 and the sheathing wire fixing part 210 to cover an end of the water-tightened submarine cable 100, and inserting the head part 250 of the pulling eye 200 into an end of the body part 230 to be fastened with the body part 230.

The process of installing the pulling eye 200 at the end of the submarine cable 100 will be described with reference to FIGS. 14 to 20 below.

Figure 14:
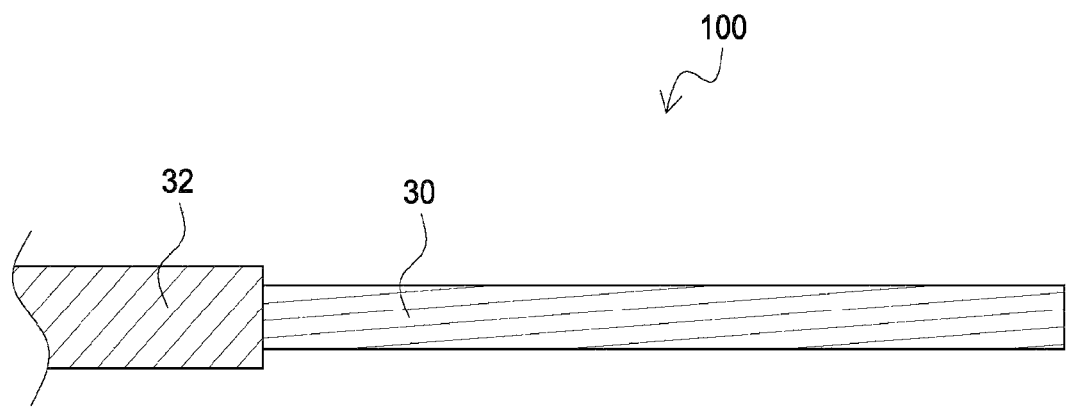
FIGS. 14 to 20 are side views illustrating a process of installing a pulling eye on an end of a submarine cable, according to an embodiment of the present invention.

First, as illustrated in FIG. 14, the sheathing wires 30 are exposed by removing the serving layer 32 of the submarine cable 100 by the certain length.

Figure 15:
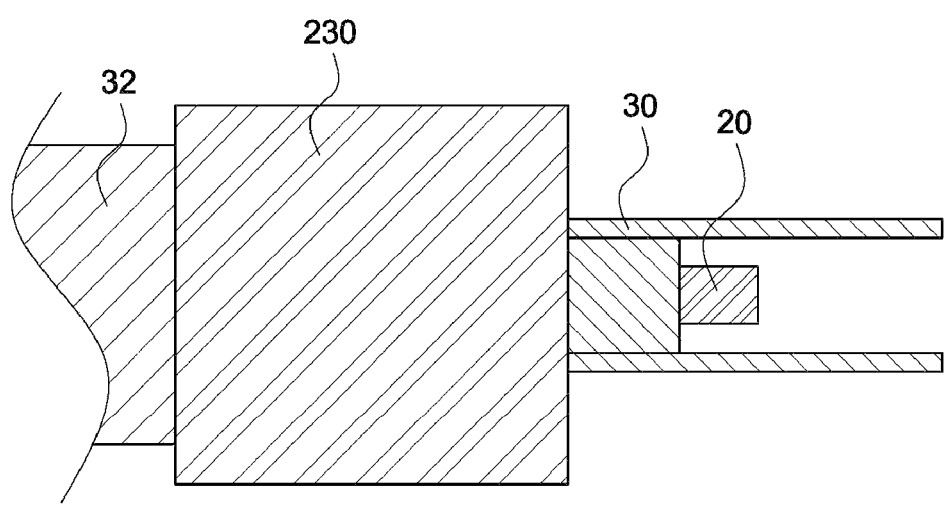

Next, as illustrated in FIG. 15, the end of the submarine cable 100 at which the sheathing wires 30 are exposed is inserted into the body part 230 of the pulling eye 200, and the non-woven fabric tapes 22 and 26 and the proofed tape 24 may be removed from the inner sheath 20 to expose a portion of the inner sheath 20 at the exposed end of the submarine cable 100. Accordingly, as illustrated in FIG. 15, a portion of the inner sheath 20 inside the exposed sheathing wires 30 may be exposed to the outside. The body part 230 penetrating the submarine cable 100 may be located on the serving layer 32 remaining on the submarine cable 100.

Figure 16:
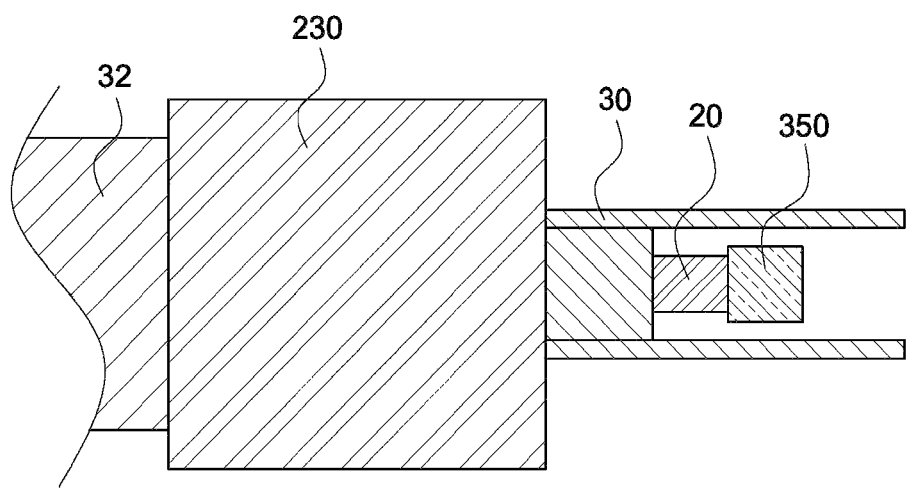
Figure 17:
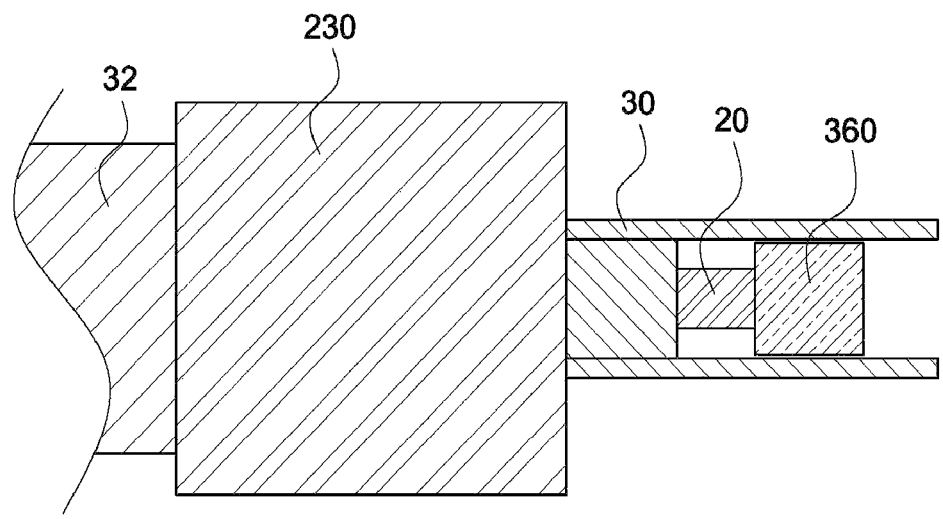

Next, the end of the exposed inner sheath 20 may be water-tightened as illustrated in FIG. 16 and then be inserted into the guide cap 360 as illustrated in FIG. 17.

In detail, the water-tightening of the exposed inner sheath 20 may include sealing the end of the exposed inner sheath 20 with the first watertight part 310, covering the first watertight part 310 and the inner sheath 20 with the termination cap 320, winding second watertight part 330 between the termination cap 320 and the exposed inner sheath 20, covering the second watertight part 330 with the at least one tension tape 340, covering the tension tape 340 and termination cap 320 with the heat shrinkable tube 350, and inserting the termination cap 320 surrounded by the heat shrinkable tube 350 into the guide cap 360. The termination cap 320 and the guide cap 360 have been described in detail above with reference to FIG. 5 and thus are not redundantly described here.

Figure 18:
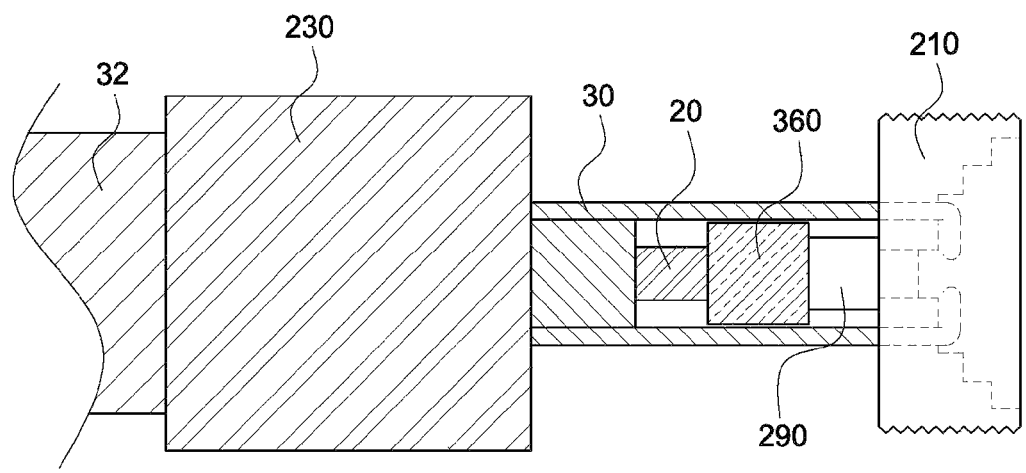

Next, as illustrated in FIG. 18, the gap maintenance member 290 is arranged between the sheathing wire fixing part 210 and the guide cap 360, and the sheathing wires 30 are inserted into the sheathing wire fixing part 210 of the pulling eye 200 to pass through the sheathing wire fixing part 210, thereby bending the ends of the sheathing wires 30 from the outside of the sheathing wires 30 toward the center of the sheathing wire fixing part 210.

In detail, in the bending of the ends of the sheathing wires 30, the sheathing wires 30 penetrating the through holes 214a formed in the stepped surface 213a adjacent to the center of the sheathing wire fixing part 210 among the through holes 214a, 214b, and 214c in the sheathing wire fixing part are bent toward the center of the sheathing wire fixing part 210, and then the sheathing wires 30 penetrating the through holes 214b formed in the stepped surface 213b outside the stepped surface 213a are bent toward the center of the sheathing wire fixing part 210. Thereafter, the sheathing wires 30 penetrating the through holes 214c formed in the stepped surface 213c outside the stepped surface 213b are bent toward the center of the sheathing wire fixing part 210.

The external diameter of the pulling eye 200 may be reduced by bending the sheathing wires 30 penetrating the sheathing wire fixing part 210 toward the center of the sheathing wire fixing part 210, i.e., from the outside of the submarine cable 100 toward the center thereof, as described above, thereby manufacturing a compact sized pulling eye. Furthermore, since the pulling eye 200 may be manufactured to be slim, manufacturing costs of the pulling eye 200 may be decreased and total installation costs for installing the pulling eye 20 in a space between the bottom of a sea and land may be decreased.

Next, as illustrated in FIG. 19, the sheathing wire fixing part 210 may be located inside the body part 230 and thus the body part 230 and the sheathing wire fixing part 210 may be fastened with each other such that the water-tightened end of the submarine cable 100 is surrounded by the body part 230. As described above, the end of the submarine cable 100 at which the sheathing wires 30 are exposed is inserted into the body part 230, and the body part 230 is located on the serving layer 32 remaining in the submarine cable 100, moved toward the sheathing wire fixing part 210 after the sheathing wires 30 are bent at the sheathing wire fixing part 210, and rotated about the lengthwise direction of the submarine cable 100, thereby fastening the body part 230 with the sheathing wire fixing part 210.

Figure 20:
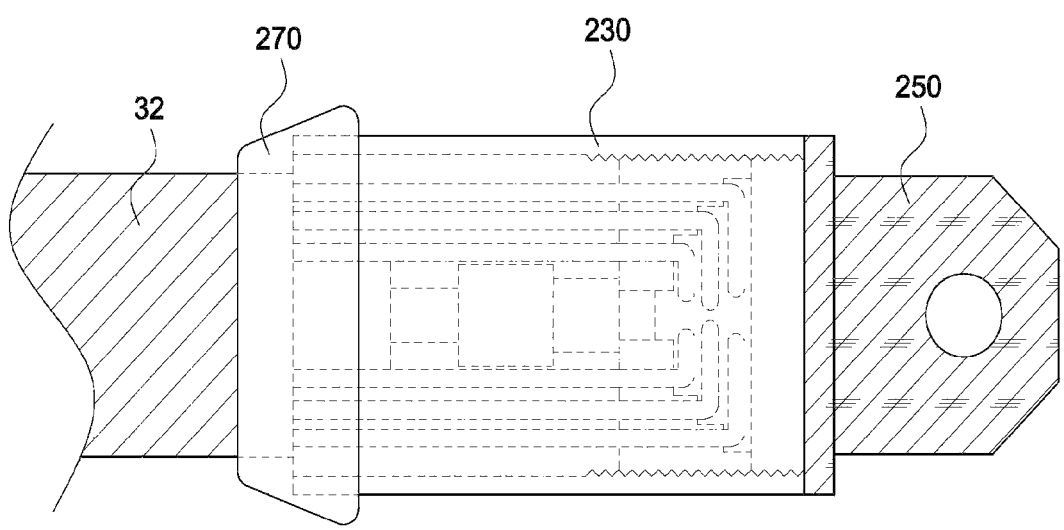

Next, as illustrated in FIG. 20, the head part 250 of the pulling eye 200 may be inserted into one end of the body part 230 to be fastened with the body part 230. As described above, screw threads are formed not only on the inner circumferential surface of the body part 230 but also a side surface of the extension part 251 of the head part 250, and the head part 270 is fastened with the body part 230 through engagement of the screw threads on the inner circumferential surface of the body part 230 and the screw threads on the side surface of the extension part 251 of the head part 250.

By fastening the head part 250 with the body part 230, ends of the bent sheathing wires 30 may be pressurized by the extension part 251 of the head part 250. That is, since the bent sheathing wires 30 are pressurized by the head part 250, the sheathing wires 30 may be more firmly fixed on the sheathing wire fixing part 210.

The head part 270 may be fixed onto the body part 230 via a bolt 370. For example, the head part 270 may include an appropriate number of fastening holes 215, and may be firmly fixed onto the body art 230 via the bolt 370 fastened with the fastening hole 215 to pass through the fastening hole 215.

Thereafter, the process of installing the pulling eye 200 may further include winding the PVC tape 270 between the body part 230 and the serving layer 32. The PVC tape 270 may seal between the body part 230 and the serving layer 32, thereby improving the watertightness of the pulling eye 200.

While the present invention has been described above with respect to exemplary embodiments thereof, it would be understood by those skilled in the art that various changes and modifications may be made without departing from the technical conception and scope of the present invention. Thus, it is clear that all modifications are included in the technical scope of the present invention as long as they include the components as claimed in the claims of the present invention.

The invention claimed is:

1. A pulling eye for a submarine cable which includes at least a conductor, a metal sheath, an inner sheath, a plurality of sheathing wires, and a serving layer, the pulling eye comprising:
   a sheathing wire fixing part configured to pressurize the sheathing wires exposed by removing the serving layer toward a center of the submarine cable from the outside, and fix bent ends of the sheathing wires thereon;
   a body part configured to be penetrated to allow the submarine cable to pass therethrough, and fastened with the sheathing wire fixing part on an inner circumferential surface thereof; and
   a head part configured to pressurize the sheathing wires bent at the sheathing wire fixing part in a lengthwise direction of the submarine cable, the head part being fastened with an upper end of the body part,
   wherein the sheathing wire fixing part comprises:
      a fastening part having screw threads formed on an outer side surface thereof to be fastened with the inner circumferential surface of the body part;
      a center hole penetrating one end of the sheathing wire fixing part to another end thereof to correspond to the center of the submarine cable;
      stepped surfaces formed by a plurality of steps formed toward the other end from the one end; and
      a plurality of through holes formed in the stepped surfaces at the other end to allow the sheathing wires to pass therethrough,
   wherein each of the plurality of steps has a round shape, and a center thereof corresponds to the center of the submarine cable.

2. The pulling eye of claim 1, wherein a difference between heights of each of the stepped surfaces and the stepped surface adjacent thereto is less than a diameter of the sheathing wires.

3. The pulling eye of claim 1, wherein the sheathing wires penetrate the through holes and the ends thereof are bent toward the center hole.

4. The pulling eye of claim 1, wherein an outer side of the body part has a cylindrical shape.

5. The pulling eye of claim 1, wherein the body part comprises screw threads formed on an inner side surface thereof, and
   screw threads formed on an outer side surface of the sheathing wire fixing part and screw threads formed on an outer side surface of the head part are engaged and coupled to each other.

6. The pulling eye of claim 1, wherein the head part comprises:
   an extension part configured to be inserted into and fastened with the upper end of the body part, the extension part being provided in the form of a step on one end of the head part; and
   a front end extending from another end of the head part in the lengthwise direction of the submarine cable,
   wherein, when inserted into and fastened with the upper end of the body part, the extension part pressurizes the ends of the sheathing wires bent and fixed on the sheathing wire fixing part.

7. The pulling eye of claim 6, wherein the extension part comprises screw threads formed on an outer side surface thereof corresponding to an inner side surface of the upper end of the body part.

8. The pulling eye of claim 6, wherein, when an accommodation part is formed by the sheathing wires fastened inside the body part and the inner side surface of the body part to accommodate the extension part, a height of the extension part is set to be greater than a depth of the accommodation part and thus the ends of the sheathing wires are pressurized by the head part when the extension part is inserted into the accommodation part and fastened with the body part.

9. The pulling eye of claim 1, wherein the inner sheath is sequentially exposed by a certain length at an end of the submarine cable, and a watertight part is provided at an end of the exposed inner sheath.

10. The pulling eye of claim 9, wherein the watertight part comprises:
- a first watertight part configured to seal the end of the exposed inner sheath and a side portion adjacent thereto;
- a termination cap configured to cover the first watertight part and the inner sheath;
- a second watertight part configured to be wound between the termination cap and the exposed inner sheath;
- at least one tension tape configured to cover the second watertight part;
- a heat shrinkable tube configured to cover the tension tape and the termination cap; and
- a guide cap configured to insert thereinto the termination cap surrounded by the heat shrinkable tube.

11. The pulling eye of claim 1, further comprising a PVC tape configured to cover between the body part and the serving layer.

12. The pulling eye of claim 1, wherein, when a plurality of the sheathing wires form at least one sheathing wire layer, a number of the stepped surfaces is greater than or equal to a number of sheathing wire layers.

13. A submarine cable which includes at least a conductor, a metal sheath, an inner sheath, sheathing wires, and a serving layer, and includes a pulling eye on at least one end thereof, wherein the pulling eye comprises:
- a sheathing wire fixing part configured to pressurize the sheathing wires exposed by removing the serving layer toward a center of the submarine cable from the outside, and fix bent ends of the sheathing wires thereon;
- a body part configured to be penetrated to allow the submarine cable to pass therethrough, and fastened with the sheathing wire fixing part on an inner circumferential surface thereof; and
- a head part configured to pressurize the sheathing wires bent at the sheathing wire fixing part in a lengthwise direction of the submarine cable, the head part being fastened with an upper end of the body part, wherein the sheathing wire fixing part comprises:
- a fastening part having screw threads formed on an outer side surface thereof to be fastened with the inner circumferential surface of the body part;
- a center hole penetrating one end of the sheathing wire fixing part to another end thereof to correspond to the center of the submarine cable;
- stepped surfaces formed by a plurality of steps formed toward the other end from the one end; and
- a plurality of through holes formed in the stepped surfaces at the other end to allow the sheathing wires to pass therethrough, wherein each of the plurality of steps has a round shape, and a center thereof corresponds to the center of the submarine cable.

14. The submarine cable of claim 13, wherein a difference between heights of each of the stepped surfaces and the stepped surface adjacent thereto is less than a diameter of the sheathing wires.

15. The submarine cable of claim 13, wherein the sheathing wires penetrate the through holes and the ends thereof are bent toward the center hole.

16. The submarine cable of claim 13, wherein an outer side of the body part has a cylindrical shape.

17. The submarine cable of claim 13, wherein the body part comprises screw threads formed on an inner side surface thereof, and
- screw threads formed on an outer side surface of the sheathing wire fixing part and screw threads formed on an outer side surface of the head part are engaged and coupled to each other.

18. The submarine cable of claim 13, wherein the head part comprises:
- an extension part configured to be inserted into and fastened with the upper end of the body part, the extension part being provided in the form of a step on one end of the head part; and
- a front end extending from another end of the head part in the lengthwise direction of the submarine cable, wherein, when inserted into and fastened with the upper end of the body part, the extension part pressurizes the ends of the sheathing wires bent and fixed on the sheathing wire fixing part.

19. The submarine cable of claim 13, wherein the inner sheath is sequentially exposed by a certain length at an end of the submarine cable, and a watertight part is provided at an end of the exposed inner sheath.

20. The submarine cable of claim 13, further comprising a PVC tape configured to cover between the body part and the serving layer.

21. The submarine cable of claim 13, further comprising a gap maintenance member provided between one end of the sheathing wire fixing part and the end of the inner sheath.

22. The submarine cable of claim 13, wherein, when a plurality of the sheathing wires form at least one sheathing wire layer, a number of the stepped surfaces is greater than or equal to a number of sheathing wire layers.

* * * * *